Oct. 13, 1925.
W. K. MICK
1,557,464
CUTTER DRILL
Filed March 20, 1924
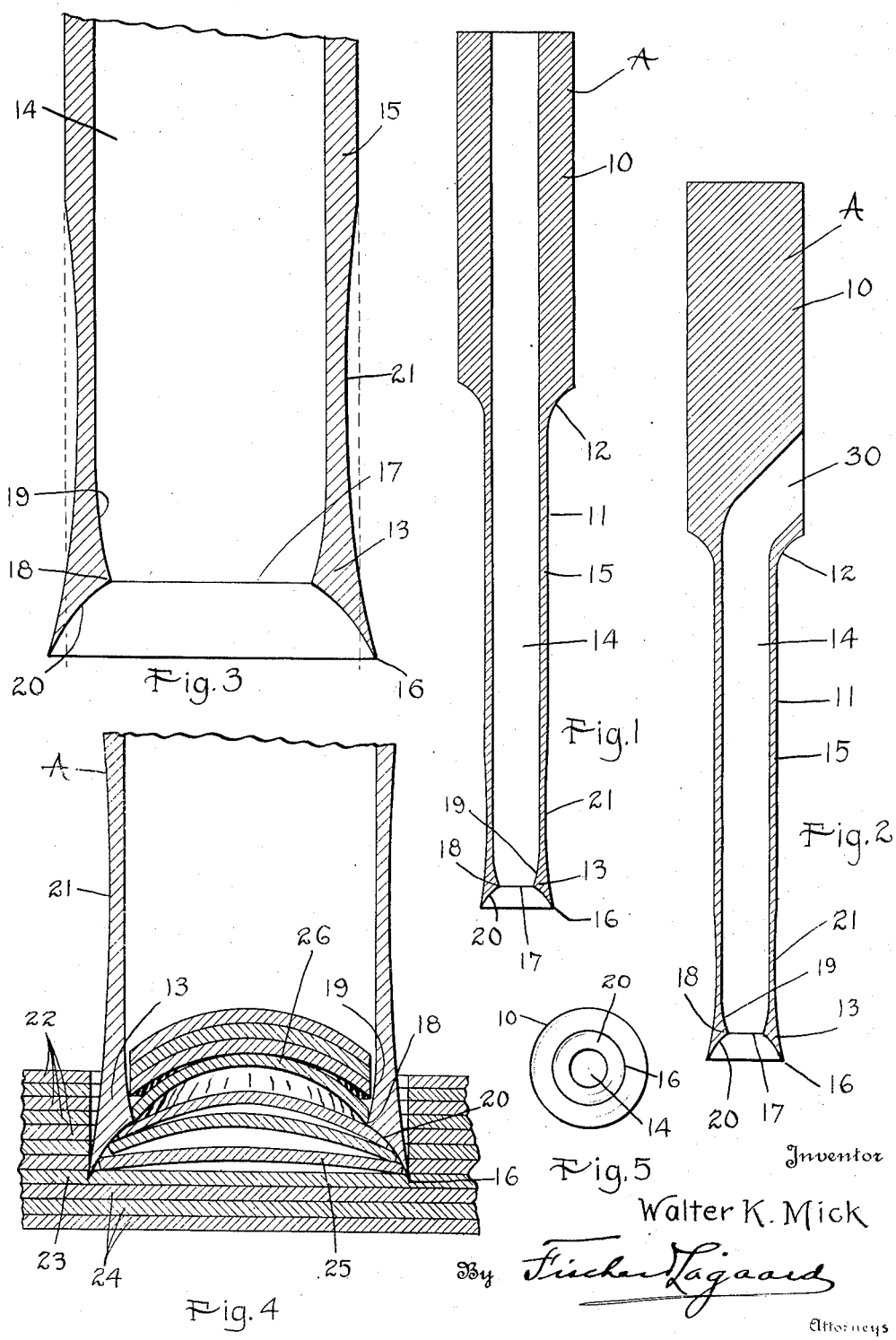
Inventor
Walter K. Mick
By Fischer Lagaard
Attorneys Patented Oct. 13, 1925.

1,557,464

UNITED STATES PATENT OFFICE.

WALTER K. MICK, OF ST. PAUL, MINNESOTA.

CUTTER DRILL.

Application filed March 20, 1924. Serial No. 700,547.

*To all whom it may concern:*

Be it known that I, WALTER K. MICK, a citizen of the United States, residing at St. Paul, in the county of Ramsey and State of Minnesota, have invented a new and useful Improvement in Cutter Drills, of which the following is a specification.

My invention relates to cutter drills for perforating or cutting circular holes in sheets of paper and has for its object to provide a drill capable of rotating at a high rate of speed and of rapidly passing through a stack of sheets without causing undue friction and dulling of the drill.

Another object of the invention resides in providing the cutting edge with a curved surface so that the cuttings from the sheets are caused to become readily cupped in order that the same may be removed through the shank of the drill with a minimum amount of resistance.

A still further object of the invention resides in providing a sharp constriction at the end of the cutting surface of the drill across which the cuttings from the sheets have to pass and to quickly enlarge the bore within the shank of the drill beyond the said constriction to afford quick relief to the cuttings.

A still further object of the invention resides in forming the extreme cutting edge of the cutter outwardly beyond the shank of the drill to give clearance to the drill in passing through the sheets or stock cut and in addition to provide an arcuate or curved peripheral recess about the drill commencing at the cutting edge and extending upwardly along the drill shank for a portion of the length of the same in order to give relief to the sheets immediately upon being perforated so as to reduce the friction and prevent the drill from heating and being injured.

The full objects and advantages of my invention will be found in the detailed description thereof and are particularly pointed out in the claims:

In the drawings illustrating my invention in one form,

Figure 1 is a longitudinal, sectional view of a drill constructed in accordance with my invention, showing the bore extending through the center of the shank.

Figure 2 is a view similar to Figure 1 of a modification of the invention showing the bore extending through the side of the shank.

Figure 3 is an enlarged, detailed view of the cutting end of the drill illustrated in Figure 1 with the parts shown in exaggerated form to illustrate the features of the invention.

Figure 4 is a view similar to Figure 3 showing the action of the drill in penetrating a stack of sheets to be perforated.

Figure 5 is an end view of the device shown in Figure 1.

In the use of cutter drills for perforating paper, cardboard and similar materials with circular holes, considerable difficulty has been found in that the drills become very quickly dulled and due to the resistance of the drill in passing through the stock perforated, as well as the resistance of the cuttings in passing through the shank of the drill, the drill becomes very quickly heated and dulled and very frequently broken. This greatly reduces the life of the drill when in constant use, rendering the cost of drilling with such drills very excessive. My invention overcomes these difficulties by providing a drill having a curved cutting edge which causes the cuttings to become permanently cupped so that the same are of considerably less diameter after severance than the interior diameter of the shank of the drill, permitting the same to freely pass upwardly through the shank without appreciable resistance. In carrying out my invention the cuttings are forced past a constriction within the drill which is of a sharp nature being of a minimum length secured by enlarging the bore of the shank upwardly from said constriction on a curved line so that throughout the movement of the cuttings through the drill maximum resistance occurs only while the cuttings are passing the said constriction, after which the same are free to move without appreciable resistance through the remainder of the shank of the drill. In addition, clearance and relief to the exterior of the drill in passing through the stock to be perforated prevents the drill from becoming over-heated and consequently dulled and injured. The results of my invention are further brought about by the curved surface of the cutting edge which causes the cuttings to be individually cupped so that the same are separated from one another and pass more freely through the shank than would be the case where the same are tightly pressed together as is the case with the drills ordinarily used.

The construction of my improved drill can best be seen in Figure 1. This drill, which is indicated in its entirety at A, as illustrated comprises a cylindrical shank 10 by means of which the same may be secured within a suitable drilling machine so that the drill may be rotated at a high rate of speed to perforate sheets of paper or other stock when the same is caused to descend thereupon. To the shank 10 is integrally connected a tubular stem 11 which is formed with a curved shoulder 12 where the same adjoins the said shank, whereby a strong, rigid connection of the stem 11 to shank 10 is afforded. Upon the extreme end of the stem 11 is formed the cutting and cupping portion of the drill, which is indicated at 13 and by means of which the cuttings are removed from the sheets of stock to be perforated. The cuttings, upon being separated from the stock, pass upwardly through a central bore 14 within the tubular stem 11, which bore extends through the shank 10, so that the cuttings may be discharged from the drill through the upper portion thereof.

The construction of the cutting and cupping portion of the invention can best be seen in Figure 3. As will be noted, the major portion of the wall 15 of the tubular stem 11 is of the same diameter throughout its length so that the bore 14 is substantially uniform throughout the upper portion of the drill. At the lower portion of this bore somewhat above the cutting edge of the drill, which is indicated at 16, the said bore 14 is reduced in diameter at 17 forming a constriction 18 within the interior of the cutter somewhat above the said cutting edge 16. The wall 15 of the tubular stem 11 is constructed on a curve 19 adjacent the constriction 18, which permits the said wall to rapidly recede away from said constriction to provide a quick relief for the cuttings when the same are discharged into the bore 14, as will presently be explained. The surface 20 of the drill extending from the cutting edge 16 to the constriction 18 is of spheroidal formation, which as will presently be explained, causes the cuttings from the sheets to be effectively and individually cupped as the drill penetrates the stock. It will be noted that the diameter of the major portion of the tubular stem 11 is substantially uniform. However, the cutting edge 16 is of a somewhat larger diameter than the diameter of the major portion of stem 11, so as to provide a clearance as the drill penetrates into the stock to be perforated. Upon the exterior of the stem 15, beginning at the cutting edge 16 and extending upwardly for a considerable distance, the material formed in said shank is removed as indicated at 21, which forms the exterior of the drill with a curved cross section at the lower end of the drill, commencing at the cutting edge of the drill and extending inwardly and subsequently outwardly to meet the exterior uniform cross section of the drill formed at the upper end of the same. This construction of the drill forms a relief for the stock after the same has been severed, which, due to the curvature of the cut away portion 21, minimizes the friction upon the stock proper as the drill passes through the same.

The operation of my invention can best be comprehended by an inspection of Figure 4. In this figure the exaggeration of the relative parts has been somewhat reduced in comparison to Figure 3, so as to illustrate more accurately the action of the drill upon the stock as the cuttings are removed therefrom. The drill A has been shown as having penetrated through a number of sheets 22 and being partly through sheet 23, other sheets 24 below the same being as yet to be penetrated. As the drill rotates the extreme cutting edge 16 of the same, which is preferably sharpened with a keen cutting edge, readily penetrates the sheets severing the cuttings therefrom. As soon as a cutting has been severed, as shown at 25, the outer edge of the same becomes engaged by the spheroidal surface 20 of the drill proper, which has the tendency to cause the said cutting to be crimped together along its edges and become cupped as illustrated. As other cuttings are removed the same force the upper cuttings along the surface 20, which cuttings become more cupped until they reach the constriction 18, at which point the same assume a shape similar to that of cutting 26. As the drill penetrates further into the stock the additional cuttings removed continue to force the cuttings above them up through the drill until the cuttings pass the constriction 18. Due to the curvature formed at 19 a quick relief is provided for the cuttings so that upon a slight upward movement of the same past this constriction the cuttings are free within the bore 14 and travel upwardly practically without engaging the interior wall of the drill, thereby moving upwardly with practically no friction. By the employment of a spheroidal surface 20 adjacent the cutting edge of the drill the cuttings are caused to become cupped in an effective and positive manner with a minimum amount of friction and effort. At the same time, each of the cuttings is independently separated upon being practically free at the top to undergo the cupping operation. Where ordinary bevelled or conical surfaces are used instead of the spheroidal surface the cuttings are more or less compressed radially inwardly instead of being cupped in the manner shown. Where no relief is granted within the bore of the drill or where a gradually tapered relief is employed the friction of the cuttings continues for a considerable distance past the throat or constriction of the cutter. Under such circumstances a cupping cannot take place as readily as is possible with my invention, which means that the cuttings must be bodily compressed together requiring a great deal more energy and causing an undue amount of friction, which soon causes the drill to heat up and to eventually break. As the drill passes through the stock relief is granted to the stock on the exterior of the drill by means of the cut away portion 21 as well as due to the clearance provided in the making of the cutting edge of the drill of a larger diameter than the stem of the drill proper.

Although my drill may be made in various sizes, and the respective dimensions of the drill considerably varies without departing from the spirit of the invention, I have found, however, that very good results are produced with a ¼ inch drill when the following dimensions are used. Of course, the size of the shank depends upon the particular machine in which the drill is to be used. Such machines, however, usually take a shank ½ inch in diameter. The length of the stem to the shank is in the vicinity of 2¼ inches as I do not find it necessary to employ a drill of greater length in ordinary work. The constriction at the cutting portion of the drill occurs at approximately .035 inches above the cutting edge. The thickness of the wall of the drill is .015 inches. The spheroidal surface connecting the cutting edge of the drill with the constriction thereof has a diameter of .292 inches, while the surface connecting the constriction with the cylindrical bore of the drill is described with a circle having a radius of 3½ inches and becoming tangent with the cylindrical bore at a distance of ¼ of an inch above said constriction. The clearance given to the cutting point is .004 of an inch greater than the diameter of the stem of the drill, making the diameter at the cutting edge .254 inches while the diameter of the stem proper is approximately .25 inches. The cut away portion upon the exterior of the drill commences at the cutting edge thereof and extends for a length of approximately ¾ of an inch above the cutting edge, being described with a circle having a radius of approximately twenty inches and extending inwardly beyond the projecting surface of the drill a distance of .0025 inches on each side, reducing the diameter of the drill at a point ¾ of an inch above the cutting edge to .245 inches.

In Figure 2, I have shown a slight modification of the invention in which the bore 14 extends upwardly into the shank 10 for a short distance only. In this form of the invention I employ an opening 30 which is cut diagonally through the side of the shank 10 and communicates with the bore 14. With this device the cuttings are caused to be discharged to the side of the machine instead of being discharged through the end of the drill. Such construction permits of utilizing a simpler machine which does not require a hollow socket and shaft for carrying the drill shank.

The advantages of my invention are manifest. An extremely efficient and effective drill is provided which may be operated at an extremely high rate of speed without danger of breakage or overheating. Due to the quick relief given both to the stock upon the exterior of the drill and to the cuttings discharged within the drill stem, a minimum amount of friction is involved making it possible to operate the drill at a high rate of speed with the employment of a minimum amount of power. By forming the cupping surface of the drill curved, the cuttings are caused to be individually cupped, which reduces the energy and friction required, shaping and cupping the cuttings so that the same may be freely discharged through the stem. By employing the curved surfaces on my drill adjacent the cutting edge thereof, a thin, razor-like construction is formed which penetrates very readily into the stock and will maintain its cutting edge sharp for a considerably longer time than where the drill is constructed in the ordinary manner. By employing a wall of uniform thickness along the upper portion of the stem a much stronger drill is provided than where the same is gradually reduced in thickness. When the drill is slightly off center the greatest stress upon the drill occurs at the point where the same is connected to the shank. With my invention this portion of the drill may be maintained of the same thickness as the remainder so that the chance of breakage is thereby reduced.

In accordance with the patent statutes I have described my invention, illustrating the best embodiment thereof, but I desire to have it understood that the invention can be carried out by other means and applied to uses other than those above set forth within the scope of the following claims.

I claim:

1. A cutter drill having a hollow stem, a cutting edge formed upon the extreme end of said stem and a constriction formed within the interior of said stem immediately above the cutting edge thereof and a curved surface formed in said stem, connecting the constriction with said cutting edge and the interior of the stem proper.

2. A cutter drill comprising a stem, a cutting edge formed at the end thereof, said stem having a wall of uniform thickness throughout its upper portion, said wall increasing abruptly in thickness near the lower portion of said drill to form a constriction shortly above said cutting edge, said wall having a concave surface extending between said constriction and said cutting edge.

3. A cutter drill comprising a hollow stem having a cutting edge formed at the end thereof and a concave cupping surface formed on said stem issuing inwardly from said cutting edge.

4. A cutter drill comprising a hollow stem of uniform diameter throughout its upper end, a cutting edge formed at the extreme end of said stem, said entire cutting edge being of a slightly larger diameter than said stem and a cut away outer portion beginning at said cutting edge and extending part way along said stem.

5. A cutter drill having a hollow stem, a cutting edge formed on one edge of said stem and reduced portions issuing inwardly and outwardly from said cutting edge, said reduced portions being formed by arc-shaped cuts in the stem.

6. A cutter drill including a hollow stem, an annular cutting edge, arcuate inner walls forming a restriction within said stem in close proximity to said cutting edge with the wall from the point of restriction receding away from the restriction to relieve frictional contact of the cuttings passing through said restriction in said hollow stem.

7. A cutter drill including a hollow stem, a cutting edge formed on said stem, arcuated inner and outer walls issuing from said cutting edge in a manner to provide a drill with surfaces arranged to relieve frictional contact with the drill on the outer wall of the same directly above the cutting edge and to provide a concave cupping restriction on the inner surface of said drill.

8. A cutter drill including a hollow stem, an annular cutting edge formed on one end of said stem, a concave surface issuing from said cutting edge on the inner surface of said drill and an inwardly curved surface issuing from said cutting edge up the side wall of the outer surface of said drill to provide a relief portion from said cutting edge in the outer surface of said drill to prevent frictional engagement of the same with the material being cut by said drill.

9. A drill formed with a hollow stem, an annular cutting edge formed on one end of said stem and curved surfaces issuing from said annular cutting edge inwardly and outwardly to provide a relief surface on the outside of said drill from said cutting edge to prevent frictional contact and a cupping surface inside of said drill with a relief surface directly adjacent the constricted portion of the cupping surface to prevent frictional contact with the work operated upon.

10. A cutting drill formed from a tubular member having an annular cutting edge on one end thereof, a concave cupping surface issuing from said cutting edge to form a constriction within said drill and a curved surface issuing from said constriction to the inner diameter of said drill to provide a quick relief and prevent frictional contact within said drill of the material cut by said annular cutting edge after it leaves said constriction.

11. A drill including a hollow stem, an annular cutting edge formed on the end of said stem, an arc-shaped reduction of said stem below its normal diameter issuing from said cutting edge on the outer surface of said stem to relieve frictional contact adjacent the cutting edge on the outer surface of said drill to prevent burning of the drill in operation.

WALTER K. MICK.